Sept. 24, 1957     E. W. WEITZEL     2,807,505
SOIL SOAKING DEVICES
Filed July 2, 1956
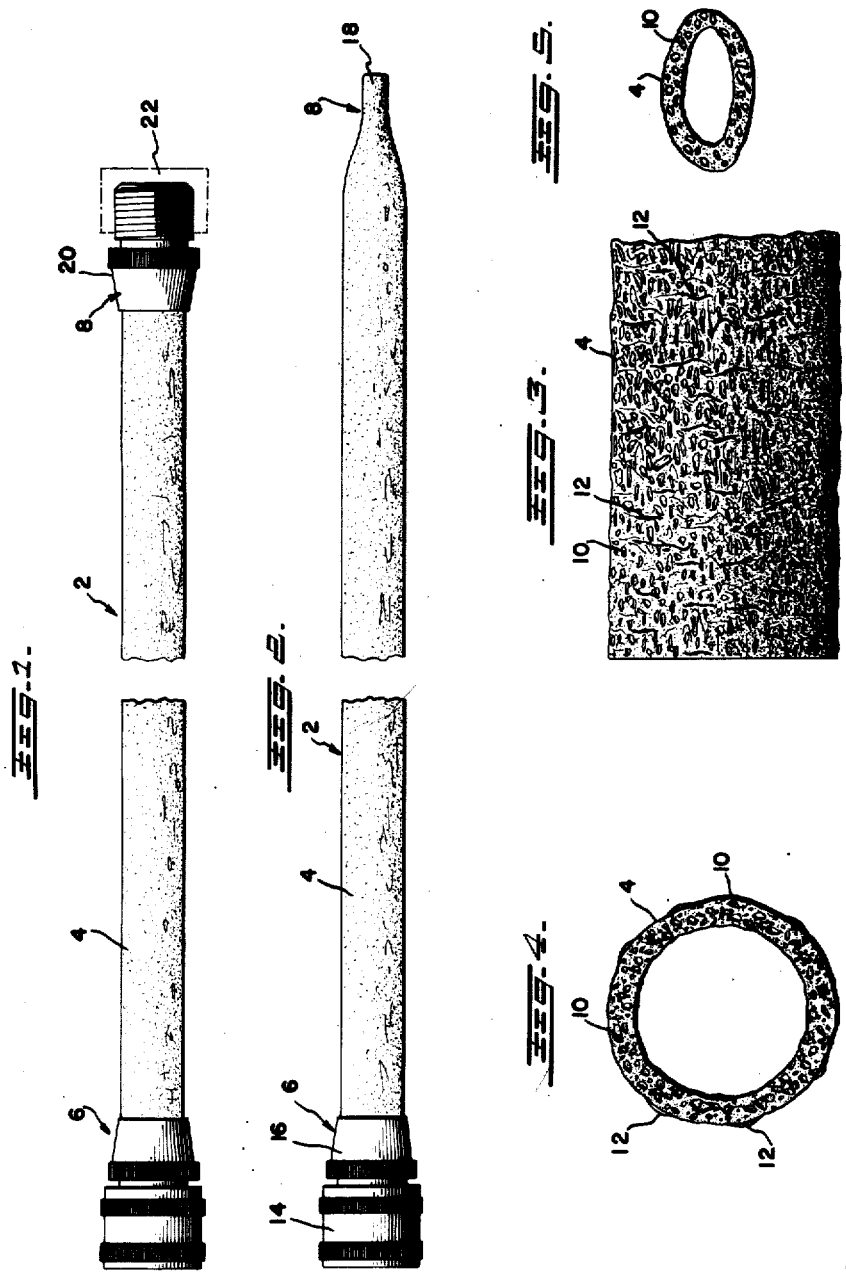
INVENTOR
EDWARD W. WEITZEL
BY Kenson + Palmer
ATTORNEYS

United States Patent Office 2,807,505
Patented Sept. 24, 1957

2,807,505

SOIL SOAKING DEVICES

Edward W. Weitzel, Hickory, N. C., assignor to Shuford Mills, Hickory, N. C., a corporation of North Carolina Application July 2, 1956, Serial No. 595,430

6 Claims. (Cl. 299—104)

This invention relates to soil soaking devices and methods for their manufacture. More particularly, it is concerned with soil soaking hoses made of porous plastic material for use in watering gardens, lawns, hothouse cultivation benches, or the like.

Various types of devices have been developed for applying water to cultivated soil areas in order to provide the sole source of water for plants growing in the area, or to supplement rain or other naturally supplied water. The majority of such devices can be classified in two broad categories. First, there are the sprinkler type devices in which water is applied as a spray, stream or mist from a tube or nozzle onto the soil area. Second, there is the perforate conduit type of device, in which water runs through openings in a channel or through the pores of a tube onto the soil area to be watered.

The sprinkler type watering device includes a wide variety of sprinkler rings, spray nozzles and some elaborate oscillating or rotating multiple orifice sprinkler units. More recently, there has come into wide-spread use the so-called "sprinkler hoses," which comprise plastic tubes having regular series of small punctures or holes therein through which the water under pressure within the tube can spray and cover the surrounding soil area.

The second category of watering devices includes well-known irrigation pipes, and also the porous tube products known as "soaking hoses." The latter products comprise fabric tubes, usually of cotton canvas or the like, having a porosity such that water under pressure within the tube trickles out of the tube onto the surrounding soil area, rather than spraying in a stream from the tube. Examples of such soaking hose products are disclosed in U. S. Patents 1,989,427 and 2,595,408.

Although the canvas type soaking hose has been known for a long time and has enjoyed quite widespread sale and use, this product has several inherent defects which have limited its use and also created dissatisfaction on the part of a large number of purchasers and users. For example, the cotton fabric of which these articles have been made in the past, is subject to attack by microorganisms, e. g., mildew, which cause a loss in the strength of the fabric and produce ultimately complete disintegration of the soaking tube. Accordingly, if the canvas soaking hoses are to be kept from rotting, it is not possible to leave them out of doors on the ground for any appreciable length of time.

A second defect in these canvas hoses involves the ease with which they can be kinked or creased, either when empty or filled with water under pressure. This presents two problems in their use. First, they are not easily placed on an area to be watered and it takes an annoying amount of time to properly lay them around a cultivated area, unless the area is of such size that the entire hose can be laid in a straight line. Secondly, where a crease or fold occurs in the canvas tube when it is laid down for watering, the water penetrates the tube at a much more rapid rate at that point than along other parts, so that there is an uneven distribution of water along the length of the tube. This results in a flooding at one or more isolated points, leaving the remainder of the area to be covered with little or no water.

Recognizing the defects in canvas soaking hoses as discussed above, as well as the advantages which they possess in comparison with sprinkler type devices for a number of applications, the manufacturers of the above "sprinkler hoses" have come to advertise their products as being usable as soaking devices. Thus, the purchaser or owner of a "sprinkler hose" is instructed by the manufacturer to turn the hose upside down so that its perforations, which generally are placed within a 180° arc, will face down toward the ground upon which the hose is laid. Used in this fashion, it is alleged that the sprinkler hose serves as a substitute for a soaking hose. However, experience has shown that the sprinkler hoses fail to act as satisfactory substitutes for soaking hoses because the water, instead of slowly trickling out from them, sprays out into fine streams which erode the soil. If the water pressure is reduced by turning down the control valve in order to stop this eroding, then the amount of water which is applied in any given time is too little to be satisfactory to the hose user. Consequently, although unsatisfactory substitutes have been proposed for the known type of soaking hoses, none have yet been found, and a real need has existed for improved soaking hoses which are capable of providing the desirable water distribution possible with a canvas soaking hose, while at the same time eliminating the rotting and kinking or creasing defects of the canvas products.

A principal object of this invention is the provision of a new type of soil soaking device, i. e., new improvements in soil soaking devices. Further objects include:

1. The provision of soil soaking hoses made of porous plastic material, which possess all of the desirable water distribution qualities of prior known canvas soaking hoses, but which do not possess the mildewing, rotting and kinking defects of the canvas type product.

2. The provision of new methods for the production of long tubular members having walls made of plastic material in the form of a porous sponge-like structure which contain a multiplicity of interconnected irregular shaped pores of such size, distribution and degree of interconnection that water under pressure within the hose will slowly trickle through the hose and spread out on the surface of the hose, so as to gradually and gently soak into the ground upon which the hose is placed.

3. The provision of new soaking hoses which may be left out of doors lying upon the ground almost indefinitely without rotting or deteriorating, so that they do not have to be lifted up and dried after each period of use.

4. The provision of new types of soil soaking hoses which do not easily kink and twist, so that they may easily and quickly be positioned in a cultivated area, even of rather odd shape, and when so positioned, will uniformly distribute the water along their entire length, so that flooding of the area to be watered in spots does not occur.

5. The provision of new forms of soaking hoses having a roguse outer surface penetrated by a plurality of elongated pores whose major axis is at an acute angle to the longitudinal axis of the hose, so that the roguse surface and pores cooperate to give an extended surface distribution of the water dispensed through the hose, in contrast to concentrated needle stream flow of water from plastic tubes which have been mechanically perforated.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

These objects are accomplished by forming a suitable flexible plastic composition which includes a blowing or expanding material into a tube by extrusion of the plastic composition while in a fluid condition, allowing the plastic mass to expand due to the action of the blowing agent upon emergence of the plastic mass from the extrusion nozzle, and thereafter cooling the extruded tube to solidify the plastic structure and obtain a flexible tube having a multiplicity of small interconnecting irregular-shaped pores, and a rugose outer surface. In performing the extrusion, the quantity of blowing agent in the plastic is controlled relative to the extrusion conditions, e. g., temperature, pressure and speed of extrusion, to create walls in the tubing having a sponge-like structure with pores the right size and with the right amount of interconnection to create relatively high resistance to high velocity flow of water therethrough, but still enable a substantial amount of water to pass per unit time. Such extruded tubing is then cut into lengths as desired, and suitable coupling devices are fixed to an end of the tube to enable it to be connected to a faucet or other source of water under pressure, while the other end of the tube is closed by a metal cap or the like, or by fusing together the walls of the tube to create the new soaking hoses.

A more complete understanding of the new products of this invention and their method of production and use can be had by reference to the accompanying drawings in which:

Fig. 1 is a fragmentary plan view of a soaking hose of the new type having a female hose coupling fixed on one end and a male hose coupling fixed upon the other end;

Fig. 2 is a fragmentary plan view of a modified form of the new soaking hoses, with the male hose coupling of the product shown in Fig. 1 being substituted by a closing means which consists of a fused end portion;

Fig. 3 is an enlarged fragmentary side view of a section of the flexible porous plastic tubing, of which the new soaking hoses are formed;

Fig. 4 is an enlarged end view of the tubing section shown in Fig. 3;

Fig. 5 is an end view of a modified form of porous tubing used to form the new soaking hoses, this form of tubing being elliptical in cross section rather than circular, as is the tubing of Figs. 3 and 4.

Referring in detail to the drawings, the new soaking hoses 2 comprise a flexible porous tubular section 4, end coupling means 6, and end closing or connecting means 8.

As previously indicated, the flexible tube 4 is made by extrusion of a suitable plastic material containing a blowing agent under required conditions of temperature and pressure to force the heated plastic mass through a suitable tubular shaping extrusion nozzle, and to cause the blowing agent to expand when the mass leaves the nozzle or extrusion die to bring about an expansion of the plastic mass with the formation of a porous, sponge-like structure.

A wide variety of plastic materials can be used in forming the tubing of which the soaking hoses are made. For example, such plastic materials as polyethylene, polyester resins, e. g., terephthalic acid-ethylene glycol polymers, flexible forms of nylon, polyurethhane resins or the like may be employed. However, it has been found that the most desirable combination of hose flexibility, strength against bursting, and weather resistance can be obtained using flexible formulations of vinyl plastics, especially plasticized vinyl chloride polymers, e. g., vinyl chloride copolymers containing small amounts of vinyl acetate, or polyvinyl chloride.

When needed, e. g., with the vinyl plastics, a wide choice of usable plasticizers is available for compounding the plastic composition used in forming the porous tubing. So-called "hot stretch plasticizers" are particularly desirable, such as dioctyl phthalate and dibenzyl benzoate, but any of the other known plasticizers which are not easily leeched or excluded from the plastic mass may be employed to give the desired amount of flexibility to the final porous tubing. Of course, the amount of plasticizer used will depend upon the particular plasticizer, and the resin used in making the extrusion material. Some forms of usable plastics, e. g., flexible grades of polyethylene and nylon, may be shaped into suitable tubing without use of plasticizers.

When vinyl polymers or the majority of other usable plastics are employed in forming the porous tubing, it is necessary to add a so-called "blowing agent" in order to cause the plastic to expand into a porous sponge-like structure. However, in the case of the polyurethane materials, the addition of a blowing agent is unnecessary, because expansion of the plastic is obtained by formation in situ of an expansion agent during the fabrication process. Where a blowing agent is employed, a number of different materials may be used. For example, organic blowing agents, e. g., dinitroso pentamethylene tetramine, are satisfactory, but better results with less expense are obtained using inorganic blowing agents such as sodium bicarbonate, ammonium carbonate, ammonium bicarbonate and ammonium sesquicarbonate. The blowing agent is usually employed in about 0.5–10% by weight of the plastic mass, the exact amount being governed by the density desired in the final tubing, and this, in turn, being controlled to some extent by the plastic and amount of plasticizer used.

The final tubing 4 contains a multiplicity of pores 10 which, as can be seen in Figs. 3 and 4, are irregular in size and shape, but which are distributed throughout the entire volume of the tube walls. The size, number, and to some extent the shape of the pores 10 in the tubing 4 can be controlled by the kind and amount of blowing agent employed, and also the conditions used in extruding the tubing, particularly the extrusion speed. While it is possible to form pores which are generally spherical in shape, it has been found that soaking hoses with the most desirable properties are obtained when the pores are longitudinally elongated, e. g., elliptical in cross section, and have their major axis disposed at an acute angle to the longitudinal axis of the tubing, i. e., disposed so that the major axis of the elongated pores does not run normal to the tubing walls. Furthermore, while it is possible to form the tubing so as to have an outside surface which is substantially smooth except for the openings formed by the pores 10, better distribution of water has been obtained with tubing that has a rugose surface created by wrinkles or slight protrusions 12.

Although the tubing 4 is relatively flexible, it is desirable not to have it to be so flimsy that it collapses when not filled with water. Such strength against collapsing is obtained by making the tubing walls of substantial thickness, i. e., about ⅛–¼" in thickness, although even thicker walls can be employed. Generally, it is desirable not to have the wall thickness less than about ⅛ of an inch in order to provide the hose with sufficient bursting strength, and also to obtain proper control of water through the tubing walls. Generally, most of the hoses have an outside diameter of about ½ to 1 inch, although smaller or larger hose sizes can be made in accordance with the invention, and for industrial purposes, large size hoses up to as big as 6–8" outside diameter can be made.

As shown in Figs. 3 and 4, the new soaking hoses can be formed with the common circular cross section, or, as shown in Fig. 5, with an elliptical cross section. This latter shape of tubing has been found to be particularly useful, since it creates a larger area of contact between the hose and the ground, thus affording more general seeping of water on the soil, and eliminating possibility of local soil erosion.

A coupling means 6 is required upon one end of the tubing 4 in order that the soaking hose may be connected to a source of water under pressure. A variety of coupling devices can be employed, but preferably a female hose coupling comprising an internally threaded rotatable ring 14 and a clamp member 16 fixed upon the end of the tubing 4 is employed.

In order to hold water within the tube under pressure so that it will be forced through the pores 10, it is necessary to provide some closing means 8 upon the end of the tube opposite to the coupling device 6. As shown in Fig. 2, this closing can be accomplished by forming a closed tip 18 on the tube by fusing together the walls of the tubing at the end thereof. On the other hand, in order to create soaking hoses of greater flexibility, enabling several separate hoses to be attached together, it is more desirable to use a standard male hose coupling 20, as shown in Fig. 1. With this, end sealing of the hose 2 can be obtained by threading a cap 22 (shown in phantom line) onto the male coupling 20.

When the new soaking hoses are formed using wall thicknesses and tubing sizes as indicated above, it is found that they have sufficient bursting strength to withstand direct pressure from substantially any normal water supply, such as city water mains. However, if it is desired to provide even higher bursting strengths, fibrous reinforcing materials may be included in the plastic mass of which the tubing is formed, or alternatively, the tubing can be enclosed in a braided filament sheath.

To use new soaking hoses, it is only necessary to unroll them, place them upon the ground, connect them to a pressured water source and turn on the water. The water trickles through the hose, spreads along the hose surface and gently flows onto the supporting soil, thoroughly soaking it, without causing localized erosion or pitting.

Since the hoses are relatively flexible, they may be used to water irregular shaped areas, such as special shaped flower beds, or the like, by laying the hose down to follow the outline of the particular area to be watered.

In contrast to canvas soaking hoses, it is not necessary to lift the new hoses up and dry them after each use, and they may be left outdoors almost continually without rotting. As a matter of fact, for special areas requiring numerous regular waterings, it is possible to employ the new soaking hoses as permanent or semi-permanent installations, e. g., in hothouse benches or the like. Of course, the new hoses can be made in any desired length, and when made in standard lengths of 25, 50 or 75 feet, with couplings on both ends, such as shown in Fig. 1, longer lengths can be formed by coupling together two or more of the standard length sections.

I claim:

1. A soil soaking hose comprising a flexible tube of plastic material having a rugose outer surface and tube walls with a thickness between about ⅛ and ¼ inch containing a multiplicity of small interconnecting irregular shaped pores, coupling means on an end of the tube for connecting the device to a supply of water under pressure and means closing the other end of the tube.

2. A soil soaking hose which is not subject to mildew attack so that it may be left on the ground outdoors without rotting, comprising a flexible tube of plasticized polyvinyl chloride plastic having walls between about ⅛ and ¼ inch in thickness that contain a multiplicity of small irregular shaped interconnecting pores therein which are of such size that water under water-main pressure contained within the tube trickles through the pores to the outside of the tube and a female hose coupling fixed to one end of said tube.

3. A soaking hose as claimed in claim 2, wherein the end of the tube opposite the end bearing said coupling is closed by fusion together of the tube walls.

4. A soaking hose as claimed in claim 2 wherein the end of the tube opposite the end bearing said coupling has fixed thereto a male hose coupling.

5. A coil soaking hose which consists of a flexible tube of plastic material having a female hose coupling fixed upon one end and a male hose coupling fixed upon the other end, said tube having an outside diameter of between about ½ and 1 inch and walls with a thickness between about ⅛ and ¼ inch, the tubing walls having throughout a multiplicity of irregular shaped pores, a portion of which interconnect, the pores being of such size that water under normal water-main pressure contained within the tube will trickle through the tube walls, the outer surface of the tube being rugose whereby water trickling through the hose is caused to spread out over the hose surface to create a relatively wide soaking strip along the entire length of the hose.

6. A soil soaking hose as claimed in claim 6, wherein said plastic material is a plasticized vinyl chloride polymer.

References Cited in the file of this patent

UNITED STATES PATENTS

| | | |
|---|---|---|
| 800,254 | Willis | Sept. 26, 1905 |
| 968,226 | Ziller | Aug. 23, 1910 |
| 1,989,427 | Robey | Jan. 29, 1935 |
| 2,122,335 | Berman et al. | June 28, 1938 |
| 2,595,408 | Quest | May 6, 1952 |
| 2,749,180 | Andrews | June 5, 1956 |
| 2,750,232 | Szantay et al. | June 12, 1956 |
| 2,759,769 | Munro | Aug. 21, 1956 |

UNITED STATES PATENT OFFICE

CERTIFICATE OF CORRECTION

Patent No. 2,807,505 September 24, 1957

Edward W. Weitzel

It is hereby certified that error appears in the printed specification of the above numbered patent requiring correction and that the said Letters Patent should read as corrected below.

Column 4, line 55, strike out "to", second occurrence; column 6, line 27, for "coil" read -- soil --; line 41, for the claim reference numeral "6" read -- 5 --.

Signed and sealed this 19th day of November 1957.

(SEAL)
Attest:

KARL H. AXLINE
Attesting Officer

ROBERT C. WATSON
Commissioner of Patents